No. 693,012. Patented Feb. 11, 1902.
J. W. HAWKINS.
ANIMAL TRAP.
(Application filed Oct. 11, 1901.)
(No Model.)
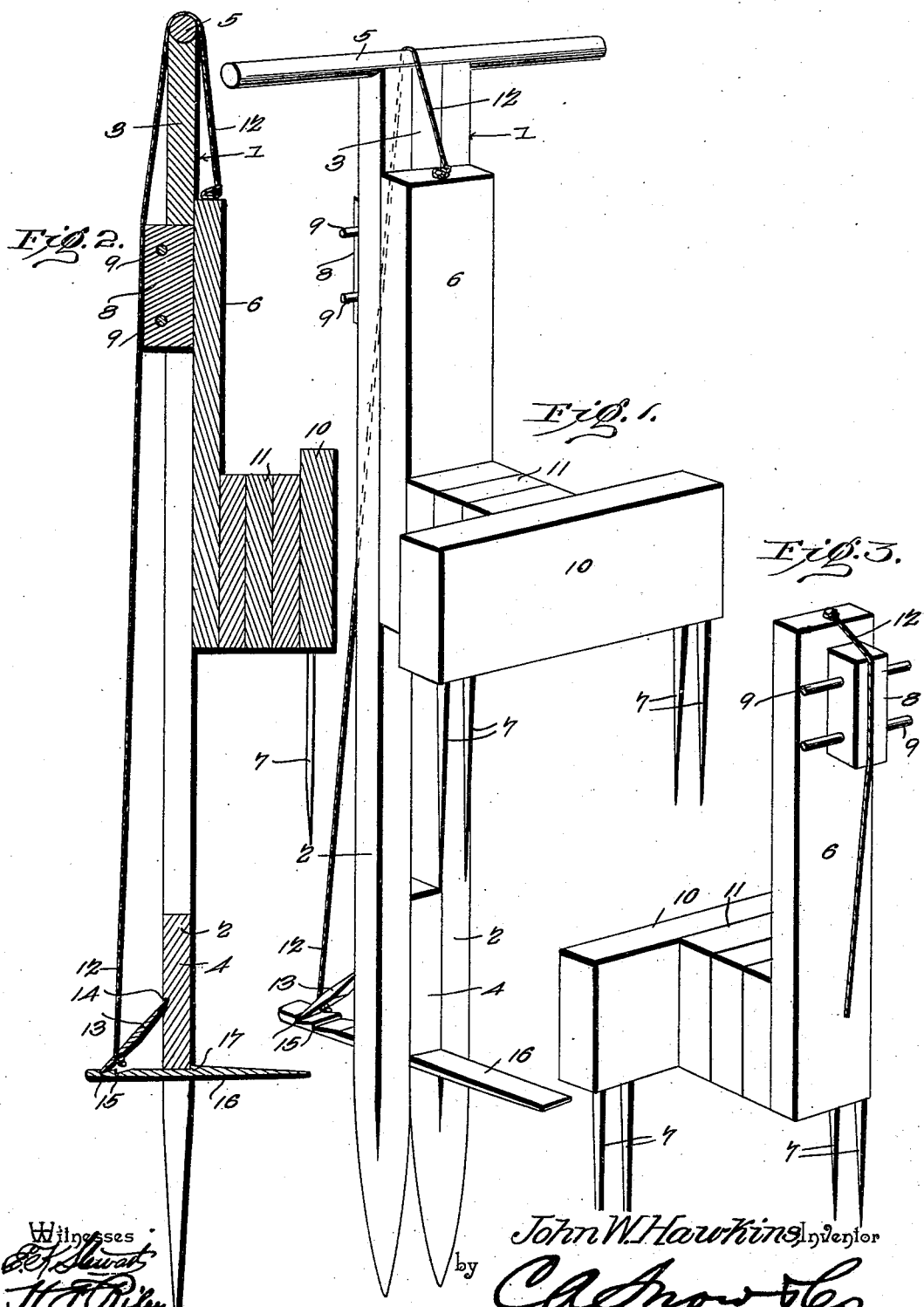

UNITED STATES PATENT OFFICE.

JOHN W. HAWKINS, OF MUNFORDVILLE, KENTUCKY.

ANIMAL-TRAP.

SPECIFICATION forming part of Letters Patent No. 693,012, dated February 11, 1902.

Application filed October 11, 1901. Serial No. 78,378. (No model.)

*To all whom it may concern:*

Be it known that I, JOHN W. HAWKINS, a citizen of the United States, residing at Munfordville, in the county of Hart and State of Kentucky, have invented a new and useful Animal-Trap, of which the following is a specification.

The invention relates to improvements in animal-traps.

The object of the present invention is to improve the construction of animal-traps and to provide a simple and inexpensive one of great strength and durability adapted to be readily manufactured and capable of catching and destroying moles and other animals.

The invention consists in the construction and novel combination and arrangement of parts hereinafter fully described, illustrated in the accompanying drawings, and pointed out in the claims hereto appended.

In the drawings, Figure 1 is a perspective view of an animal-trap constructed in accordance with this invention and shown set. Fig. 2 is a longitudinal sectional view of the same. Fig. 3 is a detail view of the follower or plunger.

Like numerals of reference designate corresponding parts in all the figures of the drawings.

1 designates a support composed of a pair of uprights or bars 2, spaced apart by upper and lower blocks 3 and 4 and secured at their upper ends to a transverse bar 5, which is extended beyond the bars 2 to form handles or grips. The lower ends of the bars 2 are extended beyond the lower spacing-block 4 and are rounded and pointed to adapt the support to be readily inserted in the ground. The uprights form a guide or way for the reception of a slide 6 of a vertically-movable follower or plunger, which carries pointed rods or spikes 7, upon which the captured animal is impaled and which are driven through the animal by the falling of the vertically-movable plunger.

The slide 6 consists of a vertical plate or piece provided with a central vertical flange or web 8, extending through the opening between the uprights or bars 2 and provided with perforations for the reception of pins or keys 9, which are arranged at the back of the support. The plunger consists of the said slide, a front slab or piece 10, and a connecting-block 11, forming a weight and consisting of one or more sections, as shown.

The trap, with the exception of the pointed rods or spikes, may be constructed of wood, and the connecting block or portion assists in weighting the vertically-movable plunger, which when the trap is sprung or tripped is adapted to drive the pointed rods or spikes through a mole or other animal. The connecting block or piece extends outward from the lower end of the slide, and the slab or piece 10 extends laterally from the block. The spikes or pointed rods are arranged in pairs at the ends of the front piece 10 and are secured in suitable sockets or perforations thereof. These spikes or pointed rods depend from the ends of the front piece and are adapted to be driven into the ground at a mole-run, and they are capable of impaling and destroying a mole or other animal. The upper edge or face of the top bar of the support is rounded to receive a flexible connection 12, consisting, preferably, of a cord and attached at one end to the top of the slide and provided at its other end with a short bar or detent 13. To set the trap, the vertically-movable plunger is raised and the flexible connection is drawn over the top of the trap, as illustrated in Figs. 1 and 2, the bar 13 being arranged at the back of the support. One end of the bar or piece 13 is engaged with a shoulder 14 of the support and its other end with a shoulder 15 of the trigger 16. The shoulder 14 is formed by a recess of the lower spacing-block 4, and the trigger, which is arranged in the crotch formed by the lower portions of the uprights or bars, is provided with a shoulder to engage the support at the front face of the lower spacing-block. The trigger 16 is arranged substantially in a horizontal position when the trap is set and it extends in advance and in rear of the support, its shoulder 17 being arranged between its ends at its upper face. One or more shoulders 15 may be provided, and the bar or detent 13 is arranged in an inclined position. The trap is placed adjacent to a mole-run, with the trigger close to the surface of the ground in such position that it will be lifted sufficiently to trip the trap when a mole passes under it. This will release the plunger, which will drop by gravity and force the pointed rods or spikes into the ground, thereby impaling the mole in the run. The trap may be arranged in any other position, and a suitable bait may be provided for attracting other animals. The ends of the bar or detent 13 are beveled to enable it to engage the shoulders of the support and the trigger.

It will be seen that the trap is simple, inexpensive, strong, and durable, that it is exceedingly sensitive, and that it is adapted for catching moles and other animals.

What I claim is—

1. A trap comprising a support composed of uprights spaced apart to form a guide or way, a vertically-movable slide located at the front of the supports and having a flange or web extending through the space between the uprights, transverse fastening devices passing through the web or flange and arranged at the back of the support and detachably securing the said web or flange to the uprights, a front piece connected with the slide and provided with means for engaging an animal, and means for setting and tripping the trap, substantially as described.

2. A trap comprising a support composed of uprights spaced apart, and blocks arranged between the uprights, one of the blocks being located adjacent to the lower portions of the uprights, said lower portions being extended to form a crotch, a vertically-movable plunger having a slide arranged at the front of the support and provided with a web or flange extending through the space between the uprights and provided with transverse fastening devices engaging the uprights and detachably securing the plunger to the support, a flexible connection attached to the slide and adapted to be drawn over the top of the support and provided with the bar or piece 13, adapted to engage the support, and the trigger arranged in the said crotch and engaging the bar or piece 13, substantially as described.

3. A trap comprising a support composed of uprights spaced apart, blocks arranged between the uprights and the top piece extended beyond the uprights to form handles, the vertically-movable plunger consisting of the slide arranged at the front of the support having the flange or web projecting through the space between the uprights and provided with a transverse fastening device located at the rear faces of the uprights and detachably securing the plunger to the support, the front piece having depending spikes or rods, and the weighted connecting-block, the flexible connection attached to the plunger and adapted to be drawn over the top of the support, the bar 13 attached to the said flexible connection, and the trigger arranged between the lower portions of the uprights, substantially as described.

In testimony that I claim the foregoing as my own I have hereto affixed my signature in the presence of two witnesses.

JOHN W. HAWKINS.

Witnesses:
W. J. MACY,
W. H. VANFLEET.